United States Patent [19]

Gray et al.

[11] Patent Number: 4,503,251
[45] Date of Patent: Mar. 5, 1985

[54] RANEY NICKEL CATALYSIS OF AROMATIC AMINES

[75] Inventors: Thomas J. Gray, Guilford; Norman G. Masse, Wallingford; Richard A. Hagstrom, Cheshire, all of Conn.

[73] Assignee: Olin Corporation, Cheshire, Conn.

[21] Appl. No.: 365,211

[22] Filed: Apr. 5, 1982

[51] Int. Cl.$^3$ .............................................. C07C 85/24
[52] U.S. Cl. ...................................... 564/450; 564/449
[58] Field of Search ................................ 564/449, 450

[56] References Cited

U.S. PATENT DOCUMENTS

| | | | |
|---|---|---|---|
| 2,092,525 | 9/1937 | Adkins et al. | 564/450 |
| 2,606,925 | 8/1952 | Whitman | 564/449 |
| 2,716,135 | 8/1955 | Winstrom | 260/580 |
| 2,945,063 | 7/1960 | Quinn et al. | 564/449 |
| 2,948,687 | 8/1960 | Hadley | 252/470 |
| 3,032,586 | 5/1962 | Dierichs et al. | 260/580 |
| 4,153,578 | 5/1979 | De Thomas et al. | 252/438 |

OTHER PUBLICATIONS

Barton Milligan and Kevin E. Gilbert, "Diaminotoluenes", *Kirk-Othmer Encyclopedia of Chemical Technology*, Third Edition, vol. 2, 1978, pp. 321-329.

*Primary Examiner*—Paul F. Shaver
*Attorney, Agent, or Firm*—Donald F. Clements; James B. Haglind

[57] ABSTRACT

Hydrogenation processes utilizing improved Raney nickel alloy catalysts are disclosed. The catalyst comprises a monolithic mesh type structure of a nickel alloy having an integral Beta phase Raney $Ni_xM_{1-x}$ coating on its outer surfaces, where M is a catalytic activator selected from the group consisting of molybdenum, ruthenium, tantalum and titanium and where x, the weight fraction of nickel in the combined alloy, is between about 0.80 and about 0.95. The catalyst is effective in processes for hydrogenating an amine-substituted aromatic compound of the type

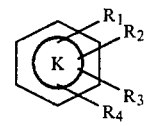

wherein K is either benzene or naphthalene, $R_1$ is a hydrogen atom or an aliphatic chain containing from about 1 to about 12 carbon atoms or a phenyl radical, $R_2$ is a hydrogen atom, an amine group or an aliphatic chain containing from about 1 to about 3 carbon atoms, $R_3$ is hydrogen or an amine group, and $R_4$ is an amine group. When this catalyst is used, substantially higher reactant flow rates and lower operating temperatures are possible as compared to conventional fluidized bed granular catalysts.

22 Claims, 4 Drawing Figures

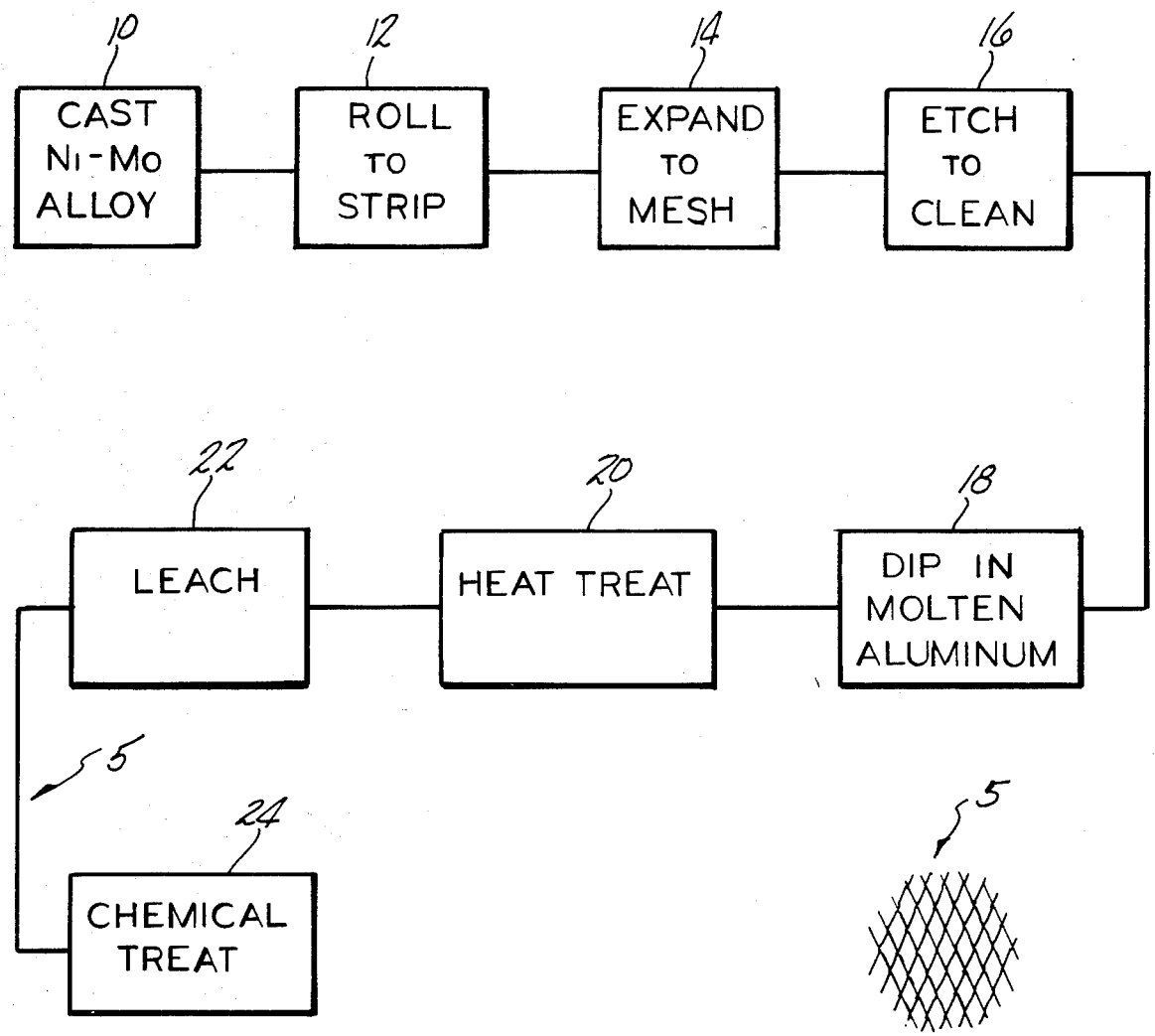

RANEY NICKEL CATALYSIS OF AROMATIC AMINES

BACKGROUND OF THE INVENTION

This invention relates to Raney nickel alloy catalysts useful for hydrogenation reactions.

Raney nickel is a well-known hydrogenation catalyst which was described originally in U.S. Pat. No. 1,638,190 issued to Raney on May 10, 1927. Raney nickel is prepared by alloying nickel and aluminum and leaching out the aluminum with alkali to expose nickel as a finely divided porous solid in which form nickel is an effective hydrogenation catalyst.

Subsequently, improved nickel catalysts have been provided in the art by alloying various metallic constituents with the nickel and aluminum prior to the treatment with alkali. For example, in U.S. Pat. No. 2,948,687 issued to Hadley on Aug. 9, 1960, molybdenum is alloyed with nickel and aluminum and treated with alkali to provide a nickel-molybdenum alloy catalyst. The use of such catalysts either as finely divided powders or precipitated onto a support structure such as $Al_2O_3$ is well known and such catalysts are widely used at the present time. However, it is also recognized that the use of these catalysts in either fixed bed or fluidized bed operations carries with them a number of constraints. For example, it is known that many of them are quite sensitive to small amounts of sulfur or carbon monoxide contamination in the feedstock. Also, when used in fluidized bed operations, the feedstock is subject to rather large pressure drops so that fairly rugged equipment is needed to move it through the bed. Lastly, many of these catalysts are sufficiently active so that if overheated during the reaction they will crack the carbonaceous feedstock and form coke on their surfaces with resultant significant decreases in activity. What is needed is a catalyst which, while retaining all of the advantages of high activity shown by Raney nickel, is not significantly affected by such operating conditions.

The catalytic reduction of an aromatic nitro compound such as dinitrotoluene to the corresponding amine-toluenediamine is a well-known and widely utilized industrial process. In many processes, such a reaction occurs at relatively low operating pressures and temperatures. However, when it is necessary to produce an alicyclic amine by saturating the underlying aromatic ring, the operating conditions become much more rigorous. Further, for amines in particular, it appears that prior art Raney catalysts are not widely utilized. Rather, catalysts based on noble metals—i.e. platinum—are normally used to accomplish this tranformation.

SUMMARY OF THE INVENTION

It is the object of this invention to provide an improved Raney nickel alloy catalyst which performs effectively in the catalytic hydrogenation of aromatic amines.

It is a further object of this invention to provide an improved Raney nickel alloy catalyst which is relatively insensitive to the presence of sulfur and carbon monoxide in the feedstock.

It is still a further object of this invention to provide an improved Raney nickel alloy catalyst which does not produce a high pressure drop in the system wherein it is used.

The present invention provides an improved monolithic Raney hydrogenation catalyst for use in hydrogenation reactions, said catalyst being comprised of an integral Raney metal alloy surface layer on a selected alloy substrate mesh structure wherein said surface layer is predominantly derived from an adherent Beta structured crystalline precursor outer portion of said structure.

Another embodiment of the invention is provided by the use of a monolithic Raney hydrogenation catalyst comprised of an integral Raney metal alloy surface layer on a metallic mesh substrate, said Raney metal alloy surface being predominantly derived from an adherent $Ni_xM_{1-x}Al_3$ Beta structured crystalline precursor surface layer, where M is a catalytic activator selected from the group consisting of molybdenum, titanium, tantalum and ruthenium and where x, the weight fraction of nickel in the combined NiM alloy, is from about 0.80 to about 0.95.

The invention further comprises a method of using said monolithic Raney catalyst in hydrogenation reactions wherein said catalyst is produced by:

(a) coating with aluminum the surfaces of a clean, non-porous perforated metal base structure of an alloy comprising from about 20 to about 5 percent by weight of a catalytic activator selected from the group consisting of molybdenum, titanium, tantalum, and ruthenium, and from about 80 to about 95 percent by weight of nickel;

(b) heating said coated surfaces by maintaining said surfaces at a temperature of from about 660° C. to about 750° C. for a time sufficient to infuse a portion of said aluminum into outer portions of said structure to produce an integral alloy layer of nickel, the catalytic activator and aluminum in said outer portions predominantly of Beta structured grains, but insufficient in time to create a predominance of Gamma structured grains in said outer portions; and (c) leaching out residual aluminum and intermetallics from the alloy layer until a Raney nickel-catalytic activator alloy layer is formed integral with said structure.

These and other objects of this invention will become apparent from the following description and the appended claims.

The Raney nickel-catalytic activator alloy catalysts of this invention have been utilized as catalysts for hydrogenating an amine-substituted aromatic compound of the type

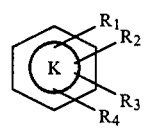

wherein K is either benzene or naphthalene, $R_1$ is a hydrogen atom or an aliphatic chain containing from about 1 to about 12 carbon atoms or a phenyl radical; $R_2$ is a hydrogen atom, an amine group or an aliphatic chain containing from about 1 to about 3 carbon atoms, $R_3$ is hydrogen or an amine group, and $R_4$ is an amine group.

It has been found that the catalysts of the present invention are applicable to this process in a manner which is substantially advantageous when compared to prior art catalysts.

BRIEF DESCRIPTION OF THE DRAWINGS

FIG. 1 is a flow diagram of a process for the preparation of an expanded mesh embodiment of the catalyst as used in the present invention.

FIG. 2 shows the overall appearance of an expanded mesh embodiment of the catalyst of FIG. 1 after NaOH leaching.

DETAILED DESCRIPTION OF THE PREFERRED EMBODIMENTS

Figure 4:
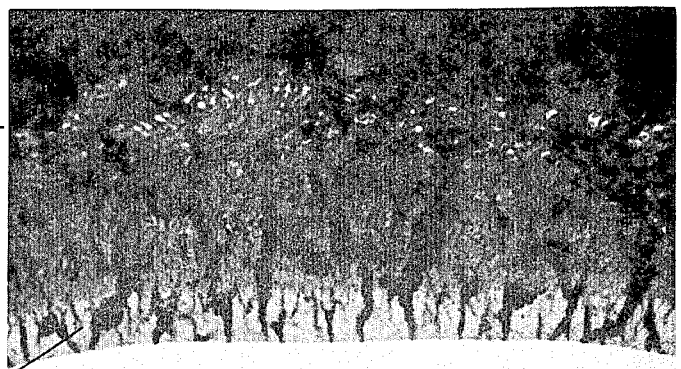
FIG. 4 is a 750× enlargement of a section of the Raney coating of FIG. 3.

This invention is described in terms of the preparation and use of a monolithic Raney nickel alloy catalyst having about 5 to about 20 percent by weight of molybdenum therein. It should be understood that the molybdenum may be replaced in whole or in part by ruthenium, titanium, tantalum or mixtures thereof in the broader aspects of the invention.

Catalyst Preparation

Catalyst (5) of the present invention is prepared as shown in FIG. 1. The integral Raney nickel alloy surface of the monolithic catalyst (5) of this invention is formed on a supportive nickel bearing core or substrate. While cores of substantially pure nickel or an appropriate nickel bearing alloy such as Inconel 600, Hastelloy C or 310 stainless steel can be used, it is preferred to have the outer portions of the core (core is used interchangeably herein with substrate) itself serve as the nickel bearing alloy outer layer. Where cores of other materials or alloys are used, a nickel alloy coating of the desired composition should first be deposited onto the surfaces thereof by a variety of known techniques such as metal dipping, electroplating, electroless plating and the like. This coating should be at least 100 microns and preferably at least 150 microns thick. This helps to substantially improve the thermal stability of the coating by making the transition across the coating/substrate interface much less abrupt and thus greatly reducing tensile stresses and the possibility of corrosion and subsequent failure at this interface.

Accordingly, the core material for the catalyst of the present invention comprises an alloy in which nickel and the selected alloying material are melted together to form a precursor ingot (10) having the desired composition. The preferred alloy weight percentage for the molybdenum component is between about 10 and about 18; for ruthenium, it is between about 5 and about 10 percent; for tantalum, it is between about 5 and about 15 percent; and for titanium, it is between about 5 and about 10 percent. The cast ingot is then rolled out to form a sheet or strip (12) preferably in the thickness range of between about 0.01 and about 0.02 inch.

While support for the catalyst of the current invention can be in the form of any conveniently shaped structure, a perforated metal base, particularly an expanded metal screen or mesh (14), is preferred. Such an open structure is found to be a significant factor in providing a catalytic process having substantial life-time and operational advantages over other types of catalytic structures used for this purpose. The final mesh which is prepared by conventional metal expansion techniques forms a regularly shaped diamond or square celled structure typically having cells on the order of 0.2 to 0.3 inch on a side. The thickness and mesh opening values are not critical and, depending on such factors as alloy composition and reaction parameters, other cell sizes could easily be used.

Prior to further processing, expanded mesh (14) is thoroughly cleaned by conventional means, such as degreasing, acid etching and/or grit blasting (16) to remove surface contaminates and thus improve the wetting of the subsequently applied aluminum to the surface.

Formation of the catalyst begins when this clean surface is subjected to an aluminizing treatment (18). By "aluminizing", as used herein, it is meant that aluminum is brought into intimate contact with the cleaned nickel bearing alloy material at the surface of the core so that when heat-treated at interdiffusion step (20), the desired nickel alloy-aluminum alloy layer is formed. This can be accomplished by any of several known methods such as flame or plasma spraying the aluminum onto the surface of the core, dipping the core into molten aluminum or by the use of fused salt electrolysis, with dipping being preferred.

Whichever method of aluminizing is used, an aluminum layer of at least 100-micron thickness should be deposited on the surface of the core. Much thicker aluminum layers of, for example, greater than 500-micron thickness, perform satisfactory in the process but for reasons for economy, aluminum layer thicknesses of between about 150 and about 300 microns are preferred. With dipping, such a thickness is achieved in a time of between about 0.5 and about 5.0 minutes when the aluminum is between about 600° C. and about 700° C.

Interdiffusion step or heat treat step (20) is carried out at a temperature of at least about 660° C., i.e., above the normal melting point of aluminum. However, to drive the interdiffusion process at a reasonable rate, higher temperatures should be used, with the temperature within the range of from about 700° C. to about 750° C. and particularly from about 715° C. to about 735° C. being most preferred. Usually interdiffusion is carried out in an atmosphere of hydrogen, nitrogen or an inert gas to prevent oxidation of the surface. This interdiffusion heat treatment is continued for a time sufficient for the aluminum and nickel alloy to react to form a nickel alloy-aluminum ternary alloy of at least about 40 microns and preferably at least about 80 microns in thickness. Interdiffusion times within the range of from about 5 to about 30 minutes satisfy this need. For nickel-molybdenum, interdiffused alloy layers of about 100 to about 400 microns in thickness are preferred, with best results obtained with a thickness from about 150 to about 300 microns.

During heat treatment at temperatures above about 660° C. excessively long interdiffusion times, e.g. 1 hour or more, and excessively high temperatures, should be avoided for technical as well as economic reasons. For example, at temperatures above about 855° C., the Beta phase quickly transforms into liquid and Gamma phase. Further, if interdiffusion at any temperature is continued too long, especially at interdiffusion temperatures of much above about 800° C., the intermetallic NiAl (Eta phase) forms which is quite resistant to subsequent leaching of the aluminum so that a satisfactory Raney surface will not form.

Lastly, for coatings on a substrate differing in composition from the coating, extended heat treatments can damage the substrate or form undesirable brittle intermetallics at the coating substrate interface. For example, if aluminum is diffused into a nickel alloy coated steel core, excessive interdiffusion time or temperature can result in the aluminum "breaking through" to diffuse into the steel base of the core. This results in the formation of a very brittle FeAl₃ intermetallic phase which will significantly undermine the strength of the bond between the core and the interdiffused layer.

By providing sufficient quantities of aluminum and nickel, while avoiding excessively long treatments or excessively high temperatures during interdiffusion, breakthrough and formation of the undesired intermetallics are avoided.

Figure 3:
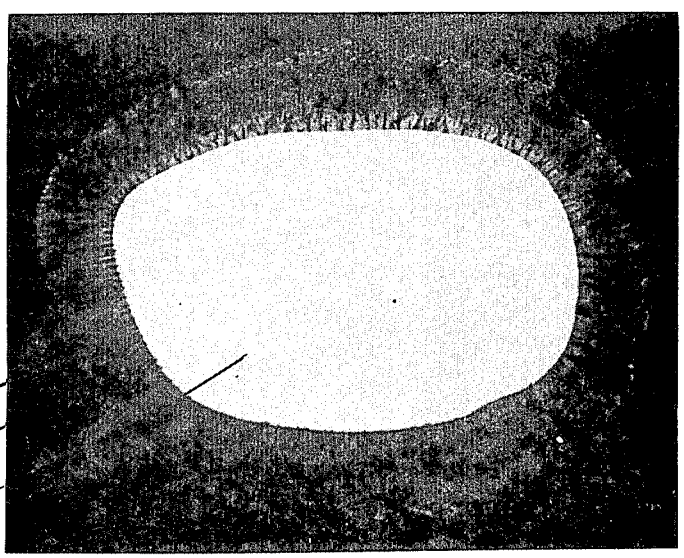
FIG. 3 is a 250× photomicrograph of a section of the mesh embodiment of the catalyst of FIG. 2 showing a Raney Ni—Mo layer after heat treatment and leaching.

The formation of the desired integral nickel-molybdenum-aluminum Beta structured ternary alloy layer is followed by a selective leaching step (22), wherein sufficient aluminum is removed to form an active Raney surface layer. For this, a strong aqueous base, such as NaOH, KOH or other strongly basic solution capable of dissolving aluminum, is generally used. Preferably, leaching is carried out with an aqueous caustic solution containing about 1 to about 30 weight percent NaOH. A preferred selective leaching procedure for producing porous nickel surfaces of the invention is carried out first for about 2 hours with 1 percent NaOH, then for about 20 hours with about 10 percent NaOH, both of these substeps being under ambient conditions in which temperature is not controlled, and finally for about 4 hours with about 30 percent NaOH at about 100° C. This leaching procedure removes at least about 60 percent, and preferably between about 75 to about 95 percent, of the aluminum from the interdiffused alloy layer and as shown in FIGS. 3 and 4 provides a porous surface of unusually high catalytic activity. It is recognized that the leaching conditions can be varied from those mentioned above to achieve equally effective selective dissolution of the aluminum.

The appearance of catalyst (5) at this stage is shown in FIG. 2. An enlarged cross section (250×) of a strand of treated Ni-12%Mo expanded metal is shown in FIG. 3 and a 750× enlargement of the porous Raney surface coating is shown in FIG. 4. In these, it is seen that the Beta structured Raney Ni-12%Mo layer is about three times as thick as the underlying Gamma layer. Since the predominant Beta layer is the outer layer which will be in contact with any medium in which the coated core is placed and is what serves to control the catalytic activity of the coating, the structure shown in FIGS. 3 and 4 is collectively called a Beta Raney Ni-12%Mo coating.

After the selective leaching, the active nickel alloy coatings may exhibit a tendency to heat up when exposed to air. If uncontrolled, this self-heating or pyrophoric tendency can easily lead to problems with coating ignition with consequent severe damage to the coating. However, chemically treating (24) the porous nickel alloy layer has been found to eliminate this problem. Convenient methods for this chemical treatment include immersing the porous nickel alloy for between about 1 hour and about 4 hours in a dilute aqueous solution of an oxidant containing, for example, by weight either (a) 3 percent $NaNO_3$, or
(b) 3 percent $K_2Cr_2O_7$, or
(c) 3 percent $NaClO_3$ and 10 percent NaOH, or
(d) 3 percent $H_2O_2$.

This treatment safely eliminates the self-heating tendency of the porous nickel alloy surface without diminishing either its catalytic activity or mechanical properties.

Lastly, before the catalyst is used for the first time, it may have to be "activated" to remove any oxidation products which may coat the surface and cause some degree of deterioration of its catalytic properties. This can be done by treating the catalyst with a flowing stream of dry hydrogen at a temperature of between about 250° C. and 350° C. for a time of between about 2 and about 24 hours. After this, it must be kept out of contact with air. Most conveniently, this operation is done in the hydrogenation reactor system used, before the first hydrogenation with the activated catalyst, and then kept in a hydrogen atmosphere or covered with an inert solvent, such as cyclohexane, thereafter.

As hereinabove noted, rather rigorous conditions must be applied to accomplish the aromatic to alicyclic amine conversion of interest. Such systems are available for both batch and continuous modes of operation. In a batch system, such as a Parr autoclave, catalyst (5) is placed in the reactor in a plurality of randomly oriented layers such that a mixture of reactive material and hydrogen will contact said layers. Typically, this can be done by mounting the layers immediately above a stirrer which will cause a continuous flow of material through them.

For continuous flow reactions, the reactive materials pass through the catalyst layers, which are present in the form of a plurality of randomly oriented stacked layers within the system, reacting enroute to form the saturated alicyclic amine compound corresponding to the aromatic amine compound entering the reactor. The open catalyst structure presents a relatively low impedance to the reactants so that the observed pressure drop through such a reactor is quite small. This low pressure drop combined with the high reactivity of the catalyst allows extremely high flow rates through the system.

In either mode of operation, to avoid poisoning or deactivating the catalyst in these reactions, it is necessary that the hydrogen be admitted to the reactor before it is charged with the reactant solution.

Also, in either system, the exothermic nature of the reaction minimizes the amount of heat needed to sustain the reaction. It has been found that when the catalyst of this invention was used in batch processing operations, the problems noted in the prior art in stabilizing the reactor to prevent the formation of coke and consequent plugging of the catalyst surface did not occur.

To facilitate hydrogenation, the reactive amine is often dissolved in an inert solvent as a carrier. This also tends to drive the reaction to completion by increasing the hydrogen:reactive amine ratio. For these systems, any inert solvent for the amine reactant may be used. Typical solvents include cyclohexane, and similar cycloaliphatics, kerosene, and decahydronaphthalene.

Suitable aromatic amine reactants include both primary and secondary aromatic amines such as aniline, 2,4- and 2,6-toluenediamine, 2,4,6-toluene triamine, toluidine, benzidine, naphthylamines, phenyl ethylamine, phenyl hexylamine, phenyl dodecylamine, naphthyl dodecylamine, p,p'-bis(aminophenyl)methane, 1,5-naphthylene diamine, etc. Mixtures of amines such as 2,4- and 2,6-toluenediamine can also be used.

The solute/solvent ratio will depend upon the solubility of the solute in the solvent. Generally speaking, it is desirable to utilize a saturated solution with flow rate and/or catalyst quantity being adjusted to assure adequate catalyst contact time to complete the reaction. In batch processes involving a fixed quantity of solution in a closed container, the reaction takes between about 30 minutes and about 6 hours depending on the temperature, hydrogen pressure and quantity of catalyst used. For example, in a batch conversion of toluenediamine to diaminomethylcyclohexane generally at an operating pressure range of between about 500 and about 2000 p.s.i. and preferably in the range of about 700 and about 1500 p.s.i. and a temperature of between about 175° C. and about 400° C., the reaction with the underlying benzene ring was complete after about 4 hours. In continuous flow systems, reaction kinetics, as a function of temperature and pressure, will determine the catalyst contact time required for any particular compound.

As noted hereinabove, saturation of the aromatic ring of an aromatic amine compound with the catalyst of this invention is quite surprising. This reaction appears to be quite specific in that there is no evidence of ring cracking or other degradative reactions.

Lastly, one problem frequently encountered with many Raney catalysts is their high sensitivity to sulfur contamination as either $H_2S$ or $SO_2$, in the feedstock. In many commercial Raney nickel catalysts, tolerance values as low as 0.1 part per million have been quoted. The catalyst of this invention has been shown to tolerate the presence of substantially higher values of sulfur in either form, as compared to commercial catalysts now in use, without being poisoned for continued use.

Another problem often found with prior art hydrogenation catalysts is that they are adversely affected by CO in the reactive stream. However, the catalyst of this invention has been found to effectively convert CO to $CH_4$ at temperatures above about 200° C. without adverse effects upon the catalyst of this invention. At these temperatures, while CO conversion may be competitive, insofar as hydrogen is concerned, the long-term utility of the catalyst is not adversely affected.

ADVANTAGES OF THIS INVENTION

The catalyst of this invention offers a number of advantages when compared to prior art granular or supported Raney nickel based catalysts. For example, the markedly reduced sensitivity to both CO and sulfur as compared to present day Raney catalysts greatly increases the utility of this catalyst.

In addition, most, if not all, commercial hydrogenation systems involving Raney catalysts employ either a granular catalyst or one carried on a support such as $Al_2O_3$. Granular catalysts must be separated and recovered for reuse, either by an external or internal filtration system built into the process stream. This requirement adds to both the expense and complexity of building and operating the system. Further, the constant abrasion of the catalyst particles against each other will eventually reduce them to a size where they are either ineffective or nonfilterable, so periodic shutdowns, on the order of about once a year, must be scheduled to replace the catalyst and clean out the system. In large installations wherein several reactors are in use, this may require having an extra reactor available to pick up the slack caused by such periodic shutdowns.

Further, in prior art supported catalysts it is not always possible to assure that the support does not either contribute some unwanted catalytic activity of its own or act in some way to attenuate or modify the activity of the Raney catalyst. With the catalyst of the present invention, these problems do not occur, which results in either a higher output for the same investment or a lower investment for the same output as compared to present systems.

Another advantage of this catalyst is its surprising ability to hydrogenate aromatic amines. Such products are known to offer considerable promise as the starting point for urethane coatings having superior non-yellowing properties. Such an ability can introduce considerable economies into the production of these quite important saturated alicyclic amine compounds as compared to presently used processes.

The following examples are given to illustrate the invention and are not deemed to be limiting thereof. All parts and percentages are by weight unless otherwise specified.

EXAMPLE 1

A catalyst was prepared as follows:

One inch diameter discs of about 0.015 inch thick Ni-12Mo alloy which had been expanded to a mesh having a diamond cell structure with dimensions of about 0.2 by 0.3 inch on a side was thoroughly cleaned by degreasing with acetone, lightly etching with 10 percent HCl, rinsing with water and, after drying, grit-blasting with No. 24 grit $Al_2O_3$ at a pressure of 3.4 $kg/CM^2$ (50 p.s.i.).

The cleaned nickel molybdenum alloy discs were aluminized by applying a commercial flux and then dipping in a pot of molten aluminum at 675° for 1 minute to entirely coat the discs with aluminum. The aluminized discs were then heat-treated at about 725° C. for about 15 minutes in a nitrogen atmosphere to interdiffuse the nickel alloy and aluminum. After heat-treating, the discs were allowed to cool in a current of nitrogen for about 2 hours which produced a predominantly Beta phase structured, interdiffused layer on the surface.

The discs were then subjected to a leaching treatment in which the aluminum was selectively removed from the interdiffused layer to produce an active porous nickel-molybdenum surface on the discs. The leaching treatment comprised immersing the interdiffused discs in 20 percent NaOH at 80° C. for approximately 1 hour to dissolve away the excess aluminum and expose the catalytically active Beta phase. After leaching, the catalyst discs were first washed to remove loose material and then placed in a Parr autoclave while still wet and dried in a stream of hydrogen. They were then activated by continuing the flow of hydrogen at a temperature of about 300° C. for about 16 hours.

EXAMPLES 2 AND 3

A 300 ml capacity Parr autoclave with 19 grams of the catalyst of Example 1 which had been preactivated at 300° C. in flowing hydrogen for 16 hours was used for these examples. The autoclave contained a stirrer and the catalyst discs were fabricated with a central hole in the mesh sufficient to allow the shaft of the stirring rod to fit loosely therethrough. The catalyst discs were not coupled to the shaft and except for some frictionally induced motion did not turn with it.

Without interruption of hydrogen flow, the reactor pressure was increased to the operating pressure and then charged with about 6.1 grams (0.05 mol) of 2-4 toluenediamine dissolved in 150 ml of cyclohexane and after which stirring was commenced and the system brought up to temperature and reacted for 4 hours. Progress of the reaction was observed by monitoring the change in hydrogen pressure as the reaction proceeded with additional hydrogen being periodically added to replace that removed by amination. Conditions of temperature, pressure, percent conversion and percent yield based on the amount of toluenediamine converted are given in Table I.

The reaction products were identified by mass spectroscopic analyses. No evidence of ring cracking was observed.

TABLE I

| Example | Temp. (°C.) | Pressure (p.s.i) | Conversion (%) | Yield (%)* | |
|---|---|---|---|---|---|
| 2 | 200 | 1400 | 54 | 33.3 | 2,4-diaminomethylcyclohexane |
|   |     |      |    | 66.9 | monoaminomethylcyclohexane |
| 3 | 175 | 800  | 13 | 44.6 | 2,4-diaminomethylcyclohexane |
|   |     |      |    | 54.4 | monoaminomethylcyclohexane |

*Based on amount of toluenediamine converted.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. In a method for hydrogenating an amine-substituted aromatic compound of the type

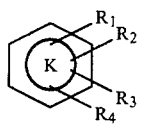

wherein K is either benzene or naphthalene, $R_1$ is a hydrogen atom or an aliphatic chain containing from about 1 to about 12 carbon atoms or a phenyl radical, $R_2$ is a hydrogen atom, an amine group or an aliphatic chain containing from about 1 to about 3 carbon atoms, $R_3$ is hydrogen or an amine group, and $R_4$ is an amine group in the presence of a catalyst, said catalyst comprising a structure comprised of a Raney metal alloy surface layer integral with and derived from a selected nickel alloy monolithic substrate mesh structure, wherein said surface layer is predominantly derived from an adherent $Ni_xM_{1-x}Al_3$ Beta phase structured crystalline precursor layer, where M is a catalytic activator selected from the group consisting of molybdenum, titanium, tantalum, ruthenium or mixtures thereof, and where x, the fraction of nickel in the combined weight of Ni and M, is within the range of from about 0.80 to about 0.95.

2. The method of claim 1 wherein said catalytic activator is molybdenum.

3. A method for hydrogenating an amine-substituted aromatic compound of the type

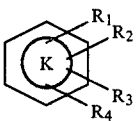

wherein K is either benzene or naphthalene, $R_1$ is a hydrogen atom or an aliphatic chain containing from about 1 to about 12 carbon atoms or a phenyl radical, $R_2$ is a hydrogen atom, an amine group or an aliphatic chain containing from about 1 to about 3 carbon atoms, $R_3$ is hydrogen or an amine group, and $R_4$ is an amine group which comprises:

(a) admixing hydrogen with said compound to form a mixture;

(b) preheating said mixture and passing it through a catalyst, said catalyst comprising a plurality of metallic mesh plates, each of said plates comprising a selected nickel alloy monolithic substrate mesh core structure and a Raney metal alloy surface layer integral with and derived from said core structure, wherein said surface layer is predominantly derived from an adherent $Ni_xM_{1-x}Al_3$ Beta phase structured crystalline precursor layer, where M is a catalytic activator selected from the group consisting of molybdenum, titanium, tantalum, ruthenium or mixtures thereof, and where x, the fraction of nickel in the combined weight of Ni and M, is within the range of from about 0.80 to about 0.95, whereby said mixture exothermally reacts to form a reaction product comprised of an alicyclic amine when contacted with said catalyst; and (c) recovering said reaction product.

4. The method of claim 1 or 4 wherein said mesh core comprises an alloy of nickel and a catalytic activator, said alloy containing between about 80 and about 95% nickel by weight.

5. The method of claim 4 wherein said catalytic activator is selected from the group consisting of molybdenum, ruthenium, tantalum, titanium, or mixtures thereof.

6. The method of claim 3 wherein said catalyst is formed by the steps comprising:

(a) coating the surfaces of a clean, non-porous metal base mesh structure of a nickel base alloy having from about 5 to about 20 percent of a catalytic activator therein with aluminum;

(b) heating said coated mesh surfaces to a temperature of from about 660° C. to about 750° C. for a time sufficient to infuse a portion of said aluminum into the outer portions of said mesh structure so as to form said integral adherent Beta structured crystalline precursor layer in its outer portions; and (c) leaching out residual aluminum from said outer portion until said Raney metal exterior surface is formed integral with said mesh structure.

7. The method of claim 3 wherein said catalyst activator is molybdenum.

8. The method of claim 3 wherein said catalyst activator is ruthenium.

9. The method of claim 3 wherein said catalyst activator is tantalum.

10. The method of claim 3 wherein said catalyst activator is titanium.

11. The method of claim 7 wherein x is between about 0.10 and about 0.18.

12. The method of claim 8 wherein x is between about 0.05 and about 0.1.

13. The method of claim 3 wherein a further step comprises dissolving said amine-substituted aromatic compound in an inert solvent to form a solution and admixing said solution with hydrogen, said hydrogenation reaction occurring when said admixed solution is contacted with said mesh catalyst.

14. The method of claim 13 wherein said hydrogenation is effected at a pressure in the range between about 500 and about 2000 p.s.i.

15. The method of claim 14 wherein said preheat temperature is between about 25° C. and about 200° C.

16. The method of claim 14 wherein said equilibrium temperature is between about 30° C. and about 400° C.

17. The method of claim 14 wherein said pressure is between about 700 and about 1500 p.s.i.

18. The method of claim 13 wherein said amine-substituted aromatic compound is aniline.

19. The method of claim 13 wherein said amine-substituted aromatic compound is toluenediamine.

20. The method of claim 13 wherein said amine-substituted aromatic compound is p,p'-bis(aminophenyl)methane.

21. The method of claim 3 further comprising the step of activating said catalyst prior to its first use.

22. The method of claim 21 wherein said activation comprises heating said catalyst in a flowing stream of gaseous hydrogen for a time between about 2 and about 24 hours at a temperature between about 250° C. and about 350° C.

* * * * *